US012070873B2

United States Patent
Lindgren et al.

(10) Patent No.: US 12,070,873 B2
(45) Date of Patent: Aug. 27, 2024

(54) METHOD OF MANUFACTURING A BUILDING PANEL AND A BUILDING PANEL

(71) Applicant: Välinge Innovation AB, Viken (SE)

(72) Inventors: Kent Lindgren, Perstorp (SE); Hans Persson, Perstorp (SE); Göran Ziegler, Viken (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 17/125,199

(22) Filed: Dec. 17, 2020

(65) Prior Publication Data

US 2021/0101310 A1 Apr. 8, 2021

Related U.S. Application Data

(63) Continuation of application No. 14/321,288, filed on Jul. 1, 2014, now Pat. No. 10,913,176.

(30) Foreign Application Priority Data

Jul. 2, 2013 (SE) .................................... 1350815-5

(51) Int. Cl.

| | |
|---|---|
| ***B27N 3/06*** | (2006.01) |
| ***B27N 3/00*** | (2006.01) |
| ***B27N 3/02*** | (2006.01) |
| ***B27N 7/00*** | (2006.01) |
| ***E04F 15/10*** | (2006.01) |

(52) U.S. Cl.

CPC ............... *B27N 3/06* (2013.01); *B27N 3/002* (2013.01); *B27N 3/02* (2013.01); *B27N 7/005* (2013.01); *E04F 15/102* (2013.01); *E04F 15/107* (2013.01); *Y10T 428/31957* (2015.04); *Y10T 428/31982* (2015.04)

(58) Field of Classification Search

CPC ....... B27N 3/002; E04F 15/102; E04F 15/107

See application file for complete search history.

(56) References Cited

U.S. PATENT DOCUMENTS

| | | | |
|---|---|---|---|
| 2,231,953 | A | 2/1941 | Ruzicka |
| 2,587,064 | A | 2/1952 | Rapson |

(Continued)

FOREIGN PATENT DOCUMENTS

| | | |
|---|---|---|
| AU | 80284/75 | 6/1975 |
| CA | 2 557 096 A1 | 7/2005 |

(Continued)

OTHER PUBLICATIONS

U.S. Appl. No. 14/563,167, Göran Ziegler and Kent Lindgren, filed Dec. 8, 2014.

(Continued)

*Primary Examiner* — Alex A Rolland

(74) *Attorney, Agent, or Firm* — Boone IP Law

(57) ABSTRACT

A method of manufacturing a building panel. The method includes applying a first binder and free lignocellulosic or cellulosic particles on a first surface of a carrier for forming a first layer, applying a second binder and free lignocellulosic or cellulosic particles on the first layer for forming a second layer, wherein the first binder is different from the second binder, and applying heat and pressure to the first and second layers to form a building panel. Also, such a building panel.

13 Claims, 2 Drawing Sheets

(56) References Cited

U.S. PATENT DOCUMENTS

| | | | |
|---|---|---|---|
| 2,831,793 A | 4/1958 | Elmendorf | |
| 2,962,081 A | 11/1960 | Dobry et al. | |
| 3,032,820 A | 5/1962 | Johnson | |
| 3,135,643 A | 6/1964 | Michl | |
| 3,164,648 A | 1/1965 | Franksson | |
| 3,286,006 A | 11/1966 | Annand | |
| 3,308,013 A | 3/1967 | Bryant | |
| 3,325,302 A | 6/1967 | Hosfeld | |
| 3,342,621 A | 9/1967 | Point et al. | |
| 3,345,234 A | 10/1967 | Jecker et al. | |
| 3,373,070 A | 3/1968 | Fuerst | |
| 3,426,730 A | 2/1969 | Lawson et al. | |
| 3,463,653 A | 8/1969 | Letter | |
| 3,486,484 A | 12/1969 | Bullough | |
| 3,533,725 A | 10/1970 | Bridgeford | |
| 3,540,978 A | 11/1970 | Ames | |
| 3,565,665 A | 2/1971 | Stranch et al. | |
| 3,647,500 A | 3/1972 | Mizuno | |
| 3,673,020 A | 6/1972 | Jaeger | |
| 3,674,619 A | 7/1972 | Scher | |
| 3,718,536 A * | 2/1973 | Downs | B27N 3/007 428/903.3 |
| 3,793,125 A | 2/1974 | Kunz | |
| 3,846,219 A | 11/1974 | Kunz | |
| 3,880,687 A | 4/1975 | Elmendorf et al. | |
| 3,897,185 A | 7/1975 | Beyer | |
| 3,897,588 A | 7/1975 | Nohtomi | |
| 3,914,359 A | 10/1975 | Bevan | |
| 3,931,428 A | 1/1976 | Reick | |
| 3,961,108 A | 6/1976 | Rosner et al. | |
| 3,975,483 A | 8/1976 | Rudloff | |
| 4,035,215 A | 7/1977 | Goldstone | |
| 4,052,739 A | 10/1977 | Wada et al. | |
| 4,093,766 A | 6/1978 | Scher et al. | |
| 4,131,705 A | 12/1978 | Kubinsky | |
| 4,255,480 A | 3/1981 | Scher | |
| 4,313,857 A | 2/1982 | Blount | |
| 4,337,290 A | 6/1982 | Kelly et al. | |
| 4,400,705 A | 8/1983 | Horike | |
| 4,420,525 A | 12/1983 | Parks | |
| 4,430,375 A | 2/1984 | Scher et al. | |
| 4,474,920 A | 10/1984 | Kyminas et al. | |
| 4,890,656 A | 1/1990 | Ohsumi et al. | |
| 5,034,272 A | 7/1991 | Lindgren et al. | |
| 5,134,026 A | 7/1992 | Melcher | |
| 5,206,066 A | 4/1993 | Horacek | |
| 5,246,765 A | 9/1993 | Lussi et al. | |
| 5,258,216 A | 11/1993 | von Bonin et al. | |
| 5,266,384 A | 11/1993 | O'Dell | |
| 5,314,554 A | 5/1994 | Owens | |
| 5,405,681 A | 4/1995 | Nakayama et al. | |
| 5,405,705 A | 4/1995 | Fujimoto et al. | |
| 5,422,170 A | 6/1995 | Iwata et al. | |
| 5,466,511 A | 11/1995 | O'Dell et al. | |
| 5,543,193 A | 8/1996 | Tesch | |
| 5,569,424 A | 10/1996 | Amour | |
| 5,601,930 A | 2/1997 | Mehta et al. | |
| 5,604,025 A | 2/1997 | Tesch | |
| 5,609,966 A | 3/1997 | Perrin et al. | |
| 5,670,237 A | 9/1997 | Shultz et al. | |
| 5,766,522 A | 6/1998 | Daly et al. | |
| 5,827,788 A | 10/1998 | Miyakoshi | |
| 5,855,832 A | 1/1999 | Clausi | |
| 5,865,003 A | 2/1999 | Klett | |
| 5,891,564 A | 4/1999 | Schultz et al. | |
| 5,925,296 A | 7/1999 | Leese | |
| 5,942,072 A | 8/1999 | McKinnon | |
| 6,036,137 A | 3/2000 | Myren | |
| 6,103,377 A | 8/2000 | Clausi | |
| 6,238,750 B1 | 5/2001 | Correll et al. | |
| 6,324,809 B1 | 12/2001 | Nelson | |
| 6,403,857 B1 | 6/2002 | Gross et al. | |
| 6,468,645 B1 | 10/2002 | Clausi | |
| 6,521,326 B1 | 2/2003 | Fischer et al. | |
| 6,537,610 B1 | 3/2003 | Springer et al. | |
| 6,617,009 B1 | 9/2003 | Chen et al. | |
| 6,620,349 B1 | 9/2003 | Lopez | |
| 6,652,695 B1 | 11/2003 | Von Der Heide et al. | |
| 6,666,951 B1 | 12/2003 | Kostiw | |
| 6,769,217 B2 | 8/2004 | Nelson | |
| 6,773,799 B1 | 8/2004 | Persson et al. | |
| 6,803,110 B2 | 10/2004 | Drees et al. | |
| 6,926,954 B2 | 8/2005 | Schuren et al. | |
| 6,991,830 B1 | 1/2006 | Hansson et al. | |
| 7,022,756 B2 | 4/2006 | Singer | |
| 7,485,693 B2 | 2/2009 | Matsuda et al. | |
| 7,811,489 B2 | 10/2010 | Pervan | |
| 8,349,234 B2 | 1/2013 | Ziegler et al. | |
| 8,349,235 B2 | 1/2013 | Pervan et al. | |
| 8,419,877 B2 | 4/2013 | Pervan et al. | |
| 8,431,054 B2 | 4/2013 | Pervan et al. | |
| 8,480,841 B2 | 7/2013 | Pervan et al. | |
| 8,481,111 B2 | 7/2013 | Ziegler et al. | |
| 8,617,439 B2 | 12/2013 | Pervan et al. | |
| 8,663,785 B2 | 3/2014 | Ziegler et al. | |
| 8,728,564 B2 | 5/2014 | Ziegler et al. | |
| 8,784,587 B2 | 7/2014 | Lindgren et al. | |
| 8,920,874 B2 | 12/2014 | Ziegler et al. | |
| 8,920,876 B2 | 12/2014 | Vetter et al. | |
| 8,973,270 B2 | 3/2015 | Siebert et al. | |
| 8,993,049 B2 | 3/2015 | Pervan | |
| 9,085,905 B2 | 7/2015 | Persson et al. | |
| 9,181,698 B2 | 11/2015 | Pervan et al. | |
| 9,255,405 B2 | 2/2016 | Pervan et al. | |
| 9,296,191 B2 | 3/2016 | Pervan et al. | |
| 9,352,499 B2 | 5/2016 | Ziegler et al. | |
| 9,403,286 B2 | 8/2016 | Vetter et al. | |
| 9,410,319 B2 | 8/2016 | Ziegler et al. | |
| 9,556,622 B2 | 1/2017 | Pervan et al. | |
| 9,573,343 B2 | 2/2017 | Pervan | |
| 9,738,095 B2 | 8/2017 | Pervan | |
| 9,757,928 B2 | 9/2017 | Pervan et al. | |
| 9,783,996 B2 | 10/2017 | Pervan et al. | |
| 10,017,950 B2 | 7/2018 | Pervan | |
| 10,100,535 B2 | 10/2018 | Pervan et al. | |
| 10,214,913 B2 | 2/2019 | Persson et al. | |
| 10,286,633 B2 | 5/2019 | Lundblad et al. | |
| 10,307,984 B2 | 6/2019 | Pervan | |
| 10,315,219 B2 | 6/2019 | Jacobsson | |
| 10,344,379 B2 | 7/2019 | Pervan et al. | |
| 10,364,578 B2 | 7/2019 | Pervan | |
| 10,392,812 B2 | 8/2019 | Pervan | |
| 10,442,152 B2 | 10/2019 | Schulte | |
| 10,442,164 B2 | 10/2019 | Schulte | |
| 10,493,729 B2 | 12/2019 | Pervan et al. | |
| 10,513,094 B2 | 12/2019 | Persson et al. | |
| 10,800,186 B2 | 10/2020 | Pervan et al. | |
| 10,828,881 B2 | 11/2020 | Bergelin et al. | |
| 10,857,765 B2 | 12/2020 | Schulte | |
| 10,899,166 B2 | 1/2021 | Pervan et al. | |
| 10,913,176 B2 | 2/2021 | Lindgren et al. | |
| 10,926,509 B2 | 2/2021 | Schulte | |
| 10,967,608 B2 | 4/2021 | Pervan | |
| 10,981,362 B2 | 4/2021 | Ziegler et al. | |
| 10,988,941 B2 | 4/2021 | Ziegler et al. | |
| 11,040,371 B2 | 6/2021 | Jacobsson | |
| 11,046,063 B2 | 6/2021 | Persson et al. | |
| 11,072,156 B2 | 7/2021 | Schulte | |
| 11,090,972 B2 | 8/2021 | Persson et al. | |
| 11,135,814 B2 | 10/2021 | Pervan et al. | |
| 11,167,533 B2 | 11/2021 | Ziegler et al. | |
| 2001/0006704 A1 | 7/2001 | Chen et al. | |
| 2001/0009309 A1 | 7/2001 | Taguchi et al. | |
| 2002/0054994 A1 | 5/2002 | Dupre et al. | |
| 2002/0100231 A1 | 8/2002 | Miller | |
| 2002/0155297 A1 | 10/2002 | Schuren | |
| 2003/0021915 A1 | 1/2003 | Rohatgi et al. | |
| 2003/0056873 A1 | 3/2003 | Nakos et al. | |
| 2003/0059639 A1 | 3/2003 | Worsley | |
| 2003/0102094 A1 | 6/2003 | Tirri et al. | |
| 2003/0119987 A1 | 6/2003 | Eadara et al. | |
| 2003/0129361 A1 | 7/2003 | Plug | |
| 2003/0208980 A1 | 11/2003 | Miller et al. | |
| 2003/0233809 A1 | 12/2003 | Pervan | |

(56) References Cited

U.S. PATENT DOCUMENTS

2004/0086678 A1 5/2004 Chen et al.
2004/0123542 A1 7/2004 Grafenauer
2004/0169710 A1 9/2004 Ide
2004/0191547 A1 9/2004 Oldorff
2004/0202857 A1 10/2004 Singer
2004/0206036 A1 10/2004 Pervan
2004/0237436 A1 12/2004 Zuber et al.
2004/0247831 A1 12/2004 Nakagawa
2004/0250911 A1 12/2004 Vogel
2005/0003099 A1 1/2005 Quist
2005/0079780 A1 4/2005 Rowe et al.
2005/0093194 A1 5/2005 Oriakhi
2005/0193677 A1 9/2005 Vogel
2005/0249929 A1 11/2005 Reichwein et al.
2005/0250879 A1 11/2005 Correll et al.
2005/0252130 A1 11/2005 Martensson
2006/0005498 A1 1/2006 Sabater et al.
2006/0008630 A1 1/2006 Thiers et al.
2006/0024465 A1 2/2006 Briere
2006/0032175 A1 2/2006 Chen et al.
2006/0048474 A1 3/2006 Pervan et al.
2006/0070321 A1 4/2006 Au
2006/0125152 A1* 6/2006 Gardner .................. B27N 3/002 264/122
2006/0142433 A1 6/2006 Rivers et al.
2006/0145384 A1 7/2006 Singer
2006/0156672 A1 7/2006 Laurent et al.
2006/0182938 A1 8/2006 Oldorff
2006/0183853 A1 8/2006 Sczepan
2006/0210777 A1 9/2006 Bauer
2007/0055012 A1 3/2007 Caldwell
2007/0066176 A1 3/2007 Wenstrup et al.
2007/0159814 A1 7/2007 Jacobsson
2007/0166516 A1 7/2007 Kim et al.
2007/0184244 A1 8/2007 Doehring
2007/0207296 A1 9/2007 Eisermann
2007/0218260 A1 9/2007 Miclo et al.
2007/0224438 A1 9/2007 Van Benthem et al.
2007/0243359 A1* 10/2007 Petersen .................. B27D 5/00 427/334
2007/0256804 A1 11/2007 Garcis Espino et al.
2007/0295446 A1 12/2007 Behr et al.
2008/0000417 A1 1/2008 Pervan et al.
2008/0032120 A1 2/2008 Braun
2008/0090032 A1 4/2008 Perrin et al.
2008/0176039 A1 7/2008 Chen et al.
2008/0263985 A1 10/2008 Hasch et al.
2009/0031662 A1 2/2009 Chen
2009/0056257 A1 3/2009 Mollinger et al.
2009/0124704 A1 5/2009 Jenkins
2009/0135356 A1 5/2009 Ando
2009/0139170 A1 6/2009 Thiers
2009/0145066 A1 6/2009 Pervan
2009/0155612 A1* 6/2009 Pervan .................... B32B 21/02 428/326
2009/0208646 A1 8/2009 Kreuder et al.
2009/0294037 A1 12/2009 Oldorff
2009/0311433 A1 12/2009 Wittmann
2010/0066121 A1 3/2010 Gross
2010/0092731 A1 4/2010 Pervan et al.
2010/0196678 A1 8/2010 Vermeulen
2010/0223881 A1 9/2010 Kalwa
2010/0239820 A1 9/2010 Buhlmann
2010/0291397 A1 11/2010 Pervan et al.
2010/0300030 A1 12/2010 Pervan et al.
2010/0307675 A1 12/2010 Buhlmann
2010/0307677 A1 12/2010 Buhlmann
2010/0310893 A1 12/2010 Derbyshire
2010/0319282 A1 12/2010 Ruland
2010/0323187 A1 12/2010 Kalwa
2010/0330376 A1 12/2010 Trksak
2011/0175251 A1 7/2011 Ziegler et al.
2011/0177319 A1 7/2011 Ziegler et al.
2011/0177354 A1 7/2011 Ziegler et al.
2011/0189448 A1 8/2011 Lindgren et al.
2011/0189471 A1 8/2011 Ziegler
2011/0247748 A1 10/2011 Pervan et al.
2011/0250404 A1 10/2011 Pervan et al.
2011/0262720 A1 10/2011 Riebel et al.
2011/0283642 A1 11/2011 Meirlaen et al.
2011/0283650 A1 11/2011 Pervan et al.
2011/0293823 A1 12/2011 Bruderer et al.
2011/0293906 A1 12/2011 Jacobsson
2012/0172494 A1 7/2012 Warnes et al.
2012/0263878 A1 10/2012 Ziegler et al.
2012/0263965 A1 10/2012 Persson et al.
2012/0264853 A1 10/2012 Ziegler et al.
2012/0288689 A1 11/2012 Hansson et al.
2012/0308774 A1 12/2012 Håkansson et al.
2013/0065072 A1 3/2013 Pervan
2013/0092314 A1 4/2013 Zeigler et al.
2013/0095315 A1 4/2013 Pervan et al.
2013/0111845 A1 5/2013 Pervan et al.
2013/0131223 A1 5/2013 Bouguettaya et al.
2013/0189534 A1 7/2013 Pervan et al.
2013/0269863 A1 10/2013 Pervan et al.
2013/0273244 A1 10/2013 Vetter et al.
2013/0273245 A1 10/2013 Ziegler et al.
2014/0017452 A1 1/2014 Pervan
2014/0044872 A1 2/2014 Pervan
2014/0075874 A1 3/2014 Pervan et al.
2014/0171554 A1 6/2014 Ziegler et al.
2014/0178630 A1 6/2014 Pervan et al.
2014/0186610 A1 7/2014 Pervan
2014/0199513 A1 7/2014 Pervan et al.
2014/0199558 A1 7/2014 Pervan et al.
2014/0234531 A1 8/2014 Ziegler et al.
2014/0255670 A1 9/2014 Kalwa
2015/0017461 A1 1/2015 Lindgren et al.
2015/0079280 A1 3/2015 Vetter et al.
2015/0093502 A1 4/2015 Ziegler et al.
2015/0111055 A1 4/2015 Persson et al.
2015/0159382 A1 6/2015 Pervan
2015/0197942 A1 7/2015 Pervan et al.
2015/0197943 A1 7/2015 Ziegler et al.
2015/0275526 A1 10/2015 Persson et al.
2015/0298433 A1 10/2015 Kalwa
2015/0343739 A1 12/2015 Pervan
2016/0031189 A1 2/2016 Pervan et al.
2016/0114495 A1 4/2016 Pervan et al.
2016/0186318 A1 6/2016 Pervan et al.
2016/0230400 A9 8/2016 Pervan et al.
2016/0303868 A1 10/2016 Hansson et al.
2016/0368180 A1 12/2016 Ziegler et al.
2016/0369507 A1 12/2016 Pervan
2016/0375674 A1 12/2016 Schulte
2017/0120558 A1 5/2017 Pervan
2017/0120564 A1 5/2017 Schulte
2017/0165936 A1 6/2017 Schulte
2017/0190156 A1 7/2017 Lundblad et al.
2017/0232761 A1 8/2017 Pervan et al.
2017/0305119 A1 10/2017 Bergelin et al.
2017/0348984 A1 12/2017 Pervan et al.
2018/0002934 A1 1/2018 Pervan et al.
2018/0291638 A1 10/2018 Pervan
2018/0370278 A1 12/2018 Persson et al.
2019/0010711 A1 1/2019 Pervan et al.
2019/0202178 A1 7/2019 Ziegler
2019/0210329 A1 7/2019 Ziegler et al.
2019/0210330 A1 7/2019 Ziegler et al.
2019/0248108 A1 8/2019 Pervan
2019/0277039 A1 9/2019 Persson et al.
2019/0284821 A1 9/2019 Pervan
2019/0292796 A1 9/2019 Pervan et al.
2019/0338534 A1 11/2019 Pervan
2020/0055287 A1 2/2020 Lundblad et al.
2020/0078825 A1 3/2020 Jacobsson
2020/0079059 A1 3/2020 Schulte
2020/0094512 A1 3/2020 Schulte
2020/0164622 A1 5/2020 Pervan et al.
2020/0215799 A1 7/2020 Hedlund et al.
2020/0223197 A1 7/2020 Hedlund et al.
2021/0001647 A1 1/2021 Pervan et al.
2021/0008863 A1 1/2021 Bergelin et al.

(56) References Cited

U.S. PATENT DOCUMENTS

| | | | |
|---|---|---|---|
| 2021/0078305 A1 | 3/2021 | Schulte |
| 2021/0129485 A1 | 5/2021 | Pervan |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |

FOREIGN PATENT DOCUMENTS

| | | | |
|---|---|---|---|
| CA | 2 810 275 | A1 | 3/2012 |
| CA | 2 852 656 | A1 | 4/2013 |
| CH | 298894 | A | 5/1954 |
| CN | 101909836 | A | 12/2010 |
| DE | 1 815 312 | A1 | 7/1969 |
| DE | 7148789 | U | 4/1972 |
| DE | 29 39 828 | A1 | 4/1981 |
| DE | 33 34 921 | A1 | 4/1985 |
| DE | 42 36 266 | A1 | 5/1993 |
| DE | 101 56 956 | A1 | 6/2003 |
| DE | 202 14 532 | U1 | 2/2004 |
| DE | 103 31 657 | A1 | 2/2005 |
| DE | 202004003061 | U1 | 7/2005 |
| DE | 102004050278 | A1 | 4/2006 |
| DE | 20 2006 007 797 | U1 | 8/2006 |
| DE | 10 2005 046 264 | A1 | 4/2007 |
| DE | 10 2006 024 593 | A1 | 12/2007 |
| DE | 10 2007 046 532 | B3 | 10/2008 |
| DE | 102007062941 | A1 | 6/2009 |
| DE | 10 2010 045 266 | A | 3/2012 |
| EP | 0 129 430 | A2 | 12/1984 |
| EP | 0 129 430 | B1 | 1/1990 |
| EP | 0 355 829 | A2 | 2/1990 |
| EP | 0 611 408 | A1 | 12/1993 |
| EP | 0 592 013 | A2 | 4/1994 |
| EP | 0656443 | A1 | 6/1995 |
| EP | 0 611 408 | B1 | 9/1996 |
| EP | 0 732 449 | A1 | 9/1996 |
| EP | 0 744 477 | A2 | 11/1996 |
| EP | 0 914 914 | A2 | 5/1999 |
| EP | 0 732 449 | B1 | 8/1999 |
| EP | 0 744 477 | B1 | 1/2000 |
| EP | 1 035 255 | A1 | 9/2000 |
| EP | 1 125 971 | A1 | 8/2001 |
| EP | 1 136 251 | A2 | 9/2001 |
| EP | 1 193 288 | A1 | 4/2002 |
| EP | 1 209 199 | A1 | 5/2002 |
| EP | 1 249 322 | A1 | 10/2002 |
| EP | 1 242 702 | B1 | 11/2004 |
| EP | 1 498 241 | A2 | 1/2005 |
| EP | 1584378 | A1 | 10/2005 |
| EP | 1 681 103 | A2 | 7/2006 |
| EP | 1690603 | A1 | 8/2006 |
| EP | 1698738 | A2 | 9/2006 |
| EP | 1 749 676 | A1 | 2/2007 |
| EP | 1507664 | B1 | 7/2007 |
| EP | 1 847 385 | A1 | 10/2007 |
| EP | 1 847 385 | B1 | 10/2007 |
| EP | 1 961 556 | A1 | 8/2008 |
| EP | 1985464 | A1 | 10/2008 |
| EP | 1 997 623 | A1 | 12/2008 |
| EP | 2 025 484 | A1 | 2/2009 |
| EP | 1 454 763 | B1 | 8/2009 |
| EP | 2105320 | A1 | 9/2009 |
| EP | 2 106 903 | A1 | 10/2009 |
| EP | 2213476 | A1 | 8/2010 |
| EP | 2226201 | A1 | 9/2010 |
| EP | 2 246 500 | A2 | 11/2010 |
| EP | 2 264 259 | A2 | 12/2010 |
| EP | 2 272 667 | A1 | 1/2011 |
| EP | 2 272 668 | A1 | 1/2011 |
| EP | 2 305 462 | A1 | 4/2011 |
| GB | 984 170 | A | 2/1965 |
| GB | 1090450 | | 11/1967 |
| GB | 2 248 246 | A | 4/1992 |
| JP | H02-229002 | A | 9/1990 |
| JP | 05-162230 | A | 6/1993 |
| JP | H11-291203 | A | 10/1999 |
| JP | 2001-287208 | A | 10/2001 |
| JP | 2002-001748 | A | 1/2002 |
| JP | 2003-311717 | A | 11/2003 |
| JP | 2003-311718 | A | 11/2003 |
| JP | 2005-034815 | A | 2/2005 |
| JP | 2005-074682 | A | 3/2005 |
| JP | 2005-170016 | A | 6/2005 |
| JP | 2005-219215 | A | 8/2005 |
| JP | 3705482 | B2 | 10/2005 |
| JP | 2005-307582 | A | 11/2005 |
| JP | 2007-216692 | A | 8/2007 |
| JP | 2007-268843 | A | 10/2007 |
| JP | 2008-188826 | A | 8/2008 |
| JP | 2011-508684 | A | 3/2011 |
| JP | 2013-539424 | A | 10/2013 |
| KR | 10-1985-0005319 | A | 8/1985 |
| KR | 10-2001-0080279 | A | 8/2001 |
| KR | 10-2012-0102580 | A | 9/2012 |
| KR | 10-2013-0102593 | A | 9/2013 |
| NZ | 225556 | A1 | 2/1992 |
| SE | 469 326 | B | 6/1993 |
| WO | 89/03753 | A1 | 5/1989 |
| WO | WO 92/06832 | A1 | 4/1992 |
| WO | 93/24295 | A1 | 12/1993 |
| WO | 93/24296 | A1 | 12/1993 |
| WO | WO 94/00280 | A1 | 1/1994 |
| WO | WO 95/06568 | A1 | 3/1995 |
| WO | WO 00/22225 | A1 | 4/2000 |
| WO | 00/24577 | A1 | 5/2000 |
| WO | WO 00/44576 | A1 | 8/2000 |
| WO | 00/53380 | A1 | 9/2000 |
| WO | WO 01/48333 | A1 | 7/2001 |
| WO | WO 01/64408 | A1 | 9/2001 |
| WO | WO 01/68367 | A1 | 9/2001 |
| WO | WO 01/74605 | A2 | 10/2001 |
| WO | WO 01/74605 | A3 | 10/2001 |
| WO | WO 01/92037 | A2 | 12/2001 |
| WO | WO 02/42167 | A2 | 5/2002 |
| WO | WO 02/42373 | A1 | 5/2002 |
| WO | WO 03/078761 | A1 | 9/2003 |
| WO | 03/95202 | A1 | 11/2003 |
| WO | WO 2004/042168 | A1 | 5/2004 |
| WO | WO 2004/050359 | A1 | 6/2004 |
| WO | WO 2004/067874 | A2 | 8/2004 |
| WO | WO 2005/010296 | A1 | 2/2005 |
| WO | WO 2005/054600 | A1 | 6/2005 |
| WO | WO 2005/066431 | A2 | 7/2005 |
| WO | 2005/080096 | A2 | 9/2005 |
| WO | WO 2005/097874 | A2 | 10/2005 |
| WO | WO 2005/116337 | A1 | 12/2005 |
| WO | WO 2005/116361 | A1 | 12/2005 |
| WO | 2006/002733 | A1 | 1/2006 |
| WO | WO 2006/007413 | A1 | 1/2006 |
| WO | 2006/015313 | A2 | 2/2006 |
| WO | WO 2006/013469 | A1 | 2/2006 |
| WO | 2006/042651 | A1 | 4/2006 |
| WO | WO 2006/043893 | A1 | 4/2006 |
| WO | 2006/066776 | A2 | 6/2006 |
| WO | WO 2006/126930 | A1 | 11/2006 |
| WO | WO 2007/015669 | A2 | 2/2007 |
| WO | WO 2007/015669 | A3 | 2/2007 |
| WO | WO 2007/042258 | A1 | 4/2007 |
| WO | WO 2007/059294 | A2 | 5/2007 |
| WO | WO 2008/004960 | A2 | 1/2008 |
| WO | WO 2008/004960 | A3 | 1/2008 |
| WO | WO 2008/004960 | A8 | 1/2008 |
| WO | 2008/057390 | A2 | 5/2008 |
| WO | WO 2008/148771 | A1 | 12/2008 |
| WO | WO 2009/065768 | A1 | 5/2009 |
| WO | WO 2009/065769 | A2 | 5/2009 |
| WO | WO 2009/065769 | A3 | 5/2009 |
| WO | WO 2009/080772 | A1 | 7/2009 |
| WO | WO 2009/080813 | A1 | 7/2009 |
| WO | WO 2009/116926 | A1 | 9/2009 |
| WO | WO 2009/124704 | A1 | 10/2009 |
| WO | WO 2009/135323 | A1 | 11/2009 |
| WO | 2010/084466 | A2 | 7/2010 |
| WO | 2010/087753 | A1 | 8/2010 |

(56) References Cited

FOREIGN PATENT DOCUMENTS

| | | | |
|---|---|---|---|
| WO | WO 2010/087752 | A1 | 8/2010 |
| WO | WO 2010/094500 | A1 | 8/2010 |
| WO | 2011/087422 | A1 | 7/2011 |
| WO | 2011/087423 | A1 | 7/2011 |
| WO | WO 2011/129757 | A1 | 10/2011 |
| WO | WO 2011/141851 | A2 | 11/2011 |
| WO | WO 2012/004699 | A2 | 1/2012 |
| WO | WO 2012/018934 | A1 | 2/2012 |
| WO | WO 2012/031922 | A1 | 3/2012 |
| WO | WO 2012/037950 | A1 | 3/2012 |
| WO | 2012/141647 | A1 | 10/2012 |
| WO | WO 2013/056745 | A1 | 4/2013 |

OTHER PUBLICATIONS

U.S. Appl. No. 14/980,638, Göran Ziegler and Kent Lindgren of Darko Pervan, Jan Jacobsson, Kent Lindgren, Göran Ziegler, Niclas Håkansson and Eddy Boucké, filed Dec. 28, 2015.

U.S. Appl. No. 15/162,868, Göran Ziegler, Marcus Bergelin, Jan Jacobsson and Melker Ryberg, filed May 24, 2016.

U.S. Appl. No. 15/704,634, Darko Pervan, Kent Lindgren, Jan Jacobsson, Eddy Boucké, Göran Ziegler and Niclas Håkansson, filed Sep. 14, 2017.

U.S. Appl. No. 16/433,722, Darko ervan, filed Jun. 6, 2019.

U.S. Appl. No. 16/439,037, Darko Pervan, Kent Lindgren, Jan Jacobsson, Eddy Boucké, Göran Ziegler and Niclas Håkansson, filed Jun. 12, 2019.

U.S. Appl. No. 16/738,468, Anette Hedlund and Sofia Nilsson, filed Jan. 9, 2020.

International Search Report issued in PCT/SE2014/050829, dated Oct. 14, 2014, Patent-och registreringsverket, Stockholm, SE, 4 pages.

Extended European Search Report issued in EP14820379.7, dated Jul. 12, 2017, European Patent Office, Munich, DE, 7 pages.

Extended European Search Report issued in EP 19184302.8, dated Oct. 16, 2019, European Patent Office, Munich, DE, 6 pages.

Notification of Reasons for Refusal, issued by the Japanese Intellectual Property Office in JP Patent Application No. 2016-523704, dated Apr. 9, 2018, 7 pages (include English-language machine translation).

Abdullah, E.C., et al., "Cohesiveness and Flowability Properties of Silica Gel Powder," *Physics International*, 2010, pp. 16-21, 1 (1), ISSN 1948-9803, Science Publications.

BTLSR Toledo, Inc. website. http://www.btlresins.com/more.html. "Advantages to Using Powdered Resins," May 26, 2007, 2 pages, per the Internet Archive WayBackMachine.

Floor Daily, "Shaw Laminates: Green by Design," Aug. 13, 2007, 1 pg, Dalton, GA.

"Hex Netting—Fencing—Ace Hardware," from http://www.acehardware.com/family/index.jsp?categoryId=1260278, archived on Nov. 1, 2009, accessed through the Internet Archive, WaybackMachine, 3 pages.

Le Fur, X., et al., "Recycling melamine-impregnated paper waste as board adhesives," published online Oct. 26, 2004, pp. 419-423, vol. 62, Springer-Verlag, DE, XP055332791.

Mortensen, A., Editor, "Wood-Plastic Composites", *Concise Encyclopedia of Composite Materials*, Second Edition, 2007, 7 pages, including pp. 932-936, Elsevier, Ltd. , NL, retrieved from the internet: https://app.knovel.com/hotlink/pdf/id:kt00U06FO1/concise-encyclopedia/wood-plastic-composites.

Nimz, H.H., "Wood," Ullmann's Encyclopedia of Industrial Chemistry, published online Jun. 15, 2000, pp. 453-505, vol. 39, Wiley-VCH Verlag Gmbh & Co. KgaA, Weinheim, DE.

Odian, George, "Principles of Polymerization," 1991, 3rd Edition, 5 pages incl. pp. 122-123, John Wiley & Sons, Inc., New York, NY, USA.

Parquet International, "Digital Printing is still an expensive process," Mar. 2008, cover page/pp. 78-79, www.parkettmagazin.com.

Patt, Rudolf, "Paper and Pulp," in *Ullmann's Encyclopedia of Industrial Chemistry*, published online 2000, 157 pages, Wiley-VCH Verlag Gmbh & Co., KGaA, Weinheim, DE.

Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.

Engstrand, Ola (Contact)/Valinge Innovation, Technical Disclosure entitled "WFF Embossing," May 15, 2009, IP.com No. IPCOM000183105D, IP.com PriorArtDatabase, 36 pages.

Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.

Decision to grant a European patent received for European Application No. 14820379.7, mailed on Aug. 1, 2019, 2 pages.

Decision to grant a European patent received for European Application No. 19184302.8, mailed on May 7, 2021, 2 pages.

Decision to Grant received for Japanese Patent Application No. 2016-523704, mailed on Aug. 3, 2018, 5 pages (2 pages of English Translation and 3 pages of Original Document).

Intention to Grant received for European Application No. 14820379.7, mailed on Mar. 5, 2019, 6 pages.

Intention to Grant received for European Application No. 19184302.8, mailed on Dec. 23, 2020, 6 pages.

Intention to Grant received for European Application No. 19184302.8, mailed on Jul. 23, 2020, 6 pages.

International Preliminary Report on Patentability received for PCT Patent Application No. PCT/SE2014/050829, mailed on Jan. 14, 2016, 7 pages.

Notice of Allowance received for Chinese Patent Application No. 201480035162.7, mailed on Aug. 24, 2021, 3 pages (2 pages of English Translation and 1 pages of Original Document).

Notice of Allowance received for Chinese Patent Application No. 202111233505.9, mailed on Jun. 7, 2023, 3 pages (2 pages of English Translation and 1 pages of Original Document).

Notice of Allowance received for Korean Patent Application No. 10-2015-7035788, mailed on Dec. 23, 2020, 4 pages (2 pages of English Translation and 2 pages of Original Document).

Notice of Allowance received for Korean Patent Application No. 10-2021-7006843, mailed on Dec. 15, 2021, 4 pages (2 pages of English Translation and 2 pages of Original Document).

Office Action received for Chinese Patent Application No. 201480035162.7, mailed on Apr. 3, 2019, 19 pages (11 pages of English Translation and 8 pages of Original Document).

Office Action received for Chinese Patent Application No. 201480035162.7, mailed on Aug. 28, 2018, 20 pages (11 pages of English Translation and 9 pages of Original Document).

Office Action received for Chinese Patent Application No. 201480035162.7, mailed on Sep. 3, 2019, 7 pages.

Office Action received for Chinese Patent Application No. 202111233505.9, mailed on Apr. 19, 2022, 7 pages (4 pages of English Translation and 3 pages of Original Document).

Office Action received for Chinese Patent Application No. 202111233505.9, mailed on Dec. 9, 2022, 10 pages (5 pages of English Translation and 5 pages of Original Document).

Office Action received for Korean Patent Application No. 10-2015-7035788, mailed on Aug. 4, 2020, 14 pages (8 pages of English Translation and 6 pages of Original Document).

Office Action received for Korean Patent Application No. 10-2021-7006843, mailed on May 27, 2021, 7 pages of Original Document Only.

U.S. Appl. No. 18/189,324, Göran Ziegler, filed Mar. 24, 2023.

* cited by examiner

METHOD OF MANUFACTURING A BUILDING PANEL AND A BUILDING PANEL

CROSS REFERENCE TO RELATED APPLICATIONS

The present application is a continuation of U.S. application Ser. No. 14/321,288, filed on Jul. 1, 2014, which claims the benefit of Swedish Application No. 1350815-5, filed on Jul. 2, 2013. The entire contents of each of U.S. application Ser. No. 14/321,288 and Swedish Application No. 1350815-5 are hereby incorporated herein by reference in their entirety.

TECHNICAL FIELD

The disclosure relates to a method of manufacturing a building panel and such a building panel comprising a first layer and a second layer.

TECHNICAL BACKGROUND

A new type of floors has recently been developed with a solid surface comprising a substantially homogenous mix of wood particles, a binder and wear resistant particles. Such floor and building panels are marketed under the trademark NADURA®.

The panels are produced according to a production method wherein the mix comprising wood fibres, binder and wear resistant particles is applied in powder form on a core. Lignocellulosic wood material may be used. The wood fibres are generally refined, mechanically worked, and of the same type as used in HDF and particleboard, i.e. treated in a way that the lignin content is essentially unchanged. The wear resistant particles are preferably aluminum oxide particles. The surface layer comprises preferably also colour pigments and/or other decorative materials or chemicals. Processed fibres such as cellulosic fibres may also be used. The processed fibres may be at least partially bleached wood fibres. The binder is preferably melamine formaldehyde resin.

The mix is scattered in dry powder form on a wood based core, such as for example HDF. The mix is cured under heat and pressure to a 0.1-1.0 mm thick a decorative surface layer.

US 2011/0250404 discloses a method of producing such a building panel described above including printing into the powder layer.

US 2007/0055012 discloses a coating system on a fibrous substrate, such as a fibrous ceiling panel. A first coating comprising a first binder is disposed on a first surface of the substrate. A second coating comprising a second binder is disposed on a second surface of the substrate. The coatings are formaldehyde-free. The first coating and the second coating expand at different rates in the presence of humidity in order to prevent sagging of the substrate when suspended in a suspended ceiling.

When curing the melamine formaldehyde resin, shrinking of the melamine formaldehyde resin leads to tension in the decorative surface layer. The internal stress formed in the decorative surface layer may cause warping of the panel. The tension at the front side of the panel should be compensated by a counteractive tension at the rear side of the panel. Therefore, a balancing layer is arranged on a rear side of the core opposite the decorative surface layer. The balancing layer is adapted to counteract and balance tension formed during curing of the decorative surface layer.

The balancing layer may be a resin impregnated paper or a formed of a mix comprising wood fibres and a thermosetting binder.

The decorative surface layer and the balancing layer are exposed to a first shrinking when the thermosetting binder in the decorative surface layer and the balancing layer cures during pressing. The balancing layer at the rear side of the core balances the tension that is created by the decorative surface layer of the front side of the core and the panel is substantially flat with a small convex backward bending when it leaves the press. Such first shrinking and balancing of the panel is referred to as "pressing balancing". The second temperature shrinking, when the panels is cooled from about 150-200 C.° to room temperature, is also balanced by the balancing layer and the panel is essentially flat. The second balancing is referred to as "cooling balancing". A small convex backward bending is preferred since this counteracts upward bending of the edges in dry conditions when the relative humidity may go down to 20% or lower during wintertime.

The decorative surface layer and the core will swell in summertime when the indoor humidity is high and shrink in wintertime when the indoor humidity is low. The panels will shrink and expand and a cupping of the edges may take place. The balancing layer is used to counteract such cupping. In the installed floor, the balancing layer is used to work as a diffusion barrier for moisture from the underlying floor, and to minimize the impact of the surrounding climate. Consequently, the balancing layer is adapted balance shrinking and expansion caused by both pressing, cooling and climate changes.

It is desirable to lower the tension formed by the decorative surface during pressing, cooling and climate changes. If the decorative surface layer gives rise to less tension, less tension is required to counteract the decorative surface layer.

SUMMARY

It is an object of at least certain embodiments of disclosure to provide an improvement over the above described techniques and known art.

A further object of at least certain embodiments of the disclosure is to provide a building panel having a surface layer, which gives rise to reduced tension during and after curing.

A further object of at least certain embodiments of the disclosure is to provide a building panel having a surface layer resulting in less movement caused by climate changes.

A further object of at least certain embodiments of the disclosure is to reduce the cost of the building panel.

At least some of these and other objects and advantages that will be apparent from the description have been achieved by a method of manufacturing a building panel, the method including applying a first binder and free lignocellulosic or cellulosic particles on a first surface of a carrier for forming a first layer, applying a second binder and free lignocellulosic or cellulosic particles on the first layer for forming a second layer, wherein the first binder is different from the second binder, and applying heat and pressure to the first and second mix to form a building panel.

By "free" lignocellulosic or cellulosic particles is meant particles that are, independently, free to move about prior to heat and pressure are applied or formed into a final layer. For example, "free" particles are not being connected or bound together by a binder or similar, such as in a sheet of paper. Lignocellulosic or cellulosic particles in a liquid binder are considered "free."

By different binder is meant a binder having a different composition, combination or different build-up in relation to the other binder. The first and second binder may also be a combination of binders.

In one embodiment, the method includes applying a first mix on a first surface of a carrier for forming a first layer, wherein the first mix comprises lignocellulosic or cellulosic particles and a first binder, applying a second mix on the first layer for forming a second layer, wherein the second mix comprises lignocellulosic or cellulosic particles and a second binder, wherein the first binder is different from the second binder, and applying heat and pressure to the first and second layers to form a building panel.

In one embodiment, the method includes applying a first binder in liquid form and lignocellulosic or cellulosic particles on a first surface of a carrier for forming a first layer, applying a second binder in liquid form and lignocellulosic or cellulosic particles on the first layer for forming a second layer, wherein the first binder is different from the second binder, and applying heat and pressure to the first and second layers to form a building panel.

The first binder may be urea formaldehyde resin, a mixture comprising urea formaldehyde resin, or a co-polymer comprising urea formaldehyde resin.

The second binder may be melamine formaldehyde resin, a mixture comprising melamine formaldehyde resin, or a co-polymer comprising melamine formaldehyde resin.

The first and the second layer may form a surface layer on the carrier, for example on a core. The first layer may form a sub-layer of the surface layer. The second layer may form a top layer of the surface layer. The first and/or the second layer may have decorative properties. The first layer forming a sub-layer may have sound-absorbing properties.

An advantage of embodiments of the disclosure is that by arranging a first layer with a first binder and a second layer with a second binder being different from the first binder, the different binders can be chosen such that tension resulting from pressing, cooling and climate changes can be reduced. By applying a first layer and a second layer, the layers can obtain different properties. Binders having different properties can be used.

By using a binder comprising urea formaldehyde resin for the first layer, tension resulting from the binder during pressing, cooling and climate changes may be reduced compared to when using melamine formaldehyde resin as a binder through all layers. By using urea melamine formaldehyde for a part of the surface layer, the cost for producing the building panel can also be reduced due to the lower cost of urea formaldehyde compared to melamine formaldehyde.

Furthermore, by reducing the forces formed by the binder in the first layer, the tension required to counteract or balance the first and second layers are reduced. The balancing layer does not have to cause counteractive tension to the same extent as when using melamine formaldehyde resin as a binder through all layers. The amount of balancing layer applied, and especially the amount of binder in the balancing layer can be decreased. Thereby, the cost for the balancing layer and consequently the cost for manufacturing the building panel can be reduced.

Furthermore, by using different binders in different layers, the different properties of the binders can be used. For example, when using urea formaldehyde resin for the first layer adapted to form a sub-layer, the advantages of the resin such as reduced tension obtained during curing and climate changes, lower cost etc. are utilized. The disadvantages associated with urea formaldehyde resin such as inferior heat and water resistance and light fastness compared to melamine formaldehyde resin may be overcome by applying a top layer comprising melamine formaldehyde resin.

In another embodiment, the first binder may be phenol formaldehyde resin, a mixture comprising phenol formaldehyde resin, or a co-polymer comprising phenol formaldehyde resin.

According to another embodiment, the first binder may be a thermoplastic binder and the second binder may be a thermosetting binder. By using a thermoplastic binder in the sub-layer, tension formed by the surface layers during pressing and cooling is decreased.

Furthermore, by reducing the forces formed by the binder in the first layer, the tension required to counteract or balance the first and second layers are reduced. The balancing layer does not have to cause counteractive tension to the same extent as when using melamine formaldehyde resin as a binder through all layers. The amount of balancing layer applied, and especially the amount of binder in the balancing layer can be decreased. Thereby, the cost for the balancing layer and consequently the cost for manufacturing the building panel can be reduced.

Another advantage is that, independently of the type of binder of the layers, the first layer forms a sub-layer that covers the first surface of the carrier. A carrier, for example having an uneven colour, may thereby be covered by a layer having a uniform colour. The first layer may include pigments. The first layer may form a base layer for printing, preferably coloured to a colour close to the final colour and/or print on the building panel.

A further advantage is that, independently of the type of binder of the layers, is that the cellulosic or lignocellulosic particles are suitable for receiving ink applied when printing on the layer, thus forming an ink receiving layer improving printing results.

The step of applying the first binder and said free lignocellulosic or cellulosic particles may comprise applying a first mix comprising the first binder and said free lignocellulosic or cellulosic particles. Thereby, a first layer having substantially uniform composition may be formed. The uniform composition may prevent the binder from being transferred between portions having different binder concentration.

The first mix may be a first powder mix. The first mix may be a dry powder mix, for example having a moisture content of 0-15%. The first powder mix may be applied by scattering. The lignocellulosic or cellulosic particles may be in powder form. The binder may be in powder form.

The step of applying the second binder and said free lignocellulosic or cellulosic particles may comprise applying a second mix comprising the second binder and said free lignocellulosic or cellulosic particles. Thereby, a second layer having substantially uniform composition may be formed. The uniform composition may prevent the binder from being transferred between portions having different binder concentration.

The second mix may be a second powder mix. The second mix may be a dry powder mix, for example having a moisture content of 0-15%. The second powder mix may be applied by scattering. The lignocellulosic or cellulosic particles may be in powder form. The binder may be in powder form.

The first binder may be applied in liquid form.

The free lignocellulosic or cellulosic particles may be applied onto the liquid first binder. As an alternative or complement, the lignocellulosic or cellulosic particles may be mixed with the first liquid binder prior to application of the first binder. The second binder may be applied in liquid form.

The free lignocellulosic or cellulosic particles may be applied onto the liquid second binder. As an alternative or complement, the lignocellulosic or cellulosic particles may be mixed with the second liquid binder prior to application of the second binder.

The second layer may further comprise wear resistant particles. The wear resistant particles may be aluminum oxide such as corundum.

The carrier may be a wood based board, preferably a HDF, MDF, particleboard, OSB, or WPC (Wood Plastic Composite). The first layer may be applied on a first surface of the wood based board. The carrier may be a vegetable fiber based board. The method may further comprise applying a balancing layer on a second surface of the board, opposite the first surface. The balancing layer may comprise a powder layer comprising cellulosic or lignocellulosic particles and a binder, preferably a thermosetting resin such as an amino resin.

The binder concentration of the first layer may substantially correspond to the binder concentration of the second layer. If one of the layers comprises a higher binder concentration than the other layer, there is a risk that the binder travels between the layers to equalize the binder concentration.

The building panel may be a floor panel. The building panel may be provided with a mechanical locking system, for example of the type described in WO2007/015669, WO2008/004960, WO2009/116926, or WO2010/087752.

In one embodiment, the lignocellulosic or cellulosic particles are replaced by synthetic fibres such as glass fibres or carbon fibres, preferably in the first layer.

According to a second aspect of the disclosure, a building panel is provided. The building panel comprises a carrier, preferably a wood based board, a first layer arranged on a first surface of the carrier, a second layer arranged on the first layer, wherein the first layer comprises a mix of lignocellulosic or cellulosic particles and a first binder, and the second layer comprises a mix of lignocellulosic or cellulosic particles and a second binder, wherein the first binder is different from the second binder.

Embodiments of the second aspect of the disclosure incorporates all the advantages of the first aspect of the disclosure, which previously has been discussed, whereby the previous discussion is applicable also for the building panel.

The first binder may be urea formaldehyde resin, a mixture comprising urea formaldehyde resin, or a co-polymer comprising urea formaldehyde resin.

The first binder may be phenol formaldehyde resin, a mixture comprising phenol formaldehyde resin, or a co-polymer comprising phenol formaldehyde resin.

The second binder may be melamine formaldehyde resin, a mixture comprising melamine formaldehyde resin, or a co-polymer comprising melamine formaldehyde resin.

The first binder may be a thermoplastic binder and the second binder may be a thermosetting binder.

The second layer may comprise wear resistance particles such as aluminum oxide. The second layer may comprise a homogenous mix of lignocellulosic or cellulosic particles, the second binder and wear resistant particles.

The building panel may further comprise a balancing layer arranged on a second surface of the carrier being opposite to said first surface, wherein the balancing layer comprises a mix comprising lignocellulosic or cellulosic material and a binder.

BRIEF DESCRIPTION OF THE DRAWINGS

The disclosure will by way of example be described in more detail with reference to the appended schematic drawings, which show embodiments of the disclosure.

DETAILED DESCRIPTION

Figure 1:
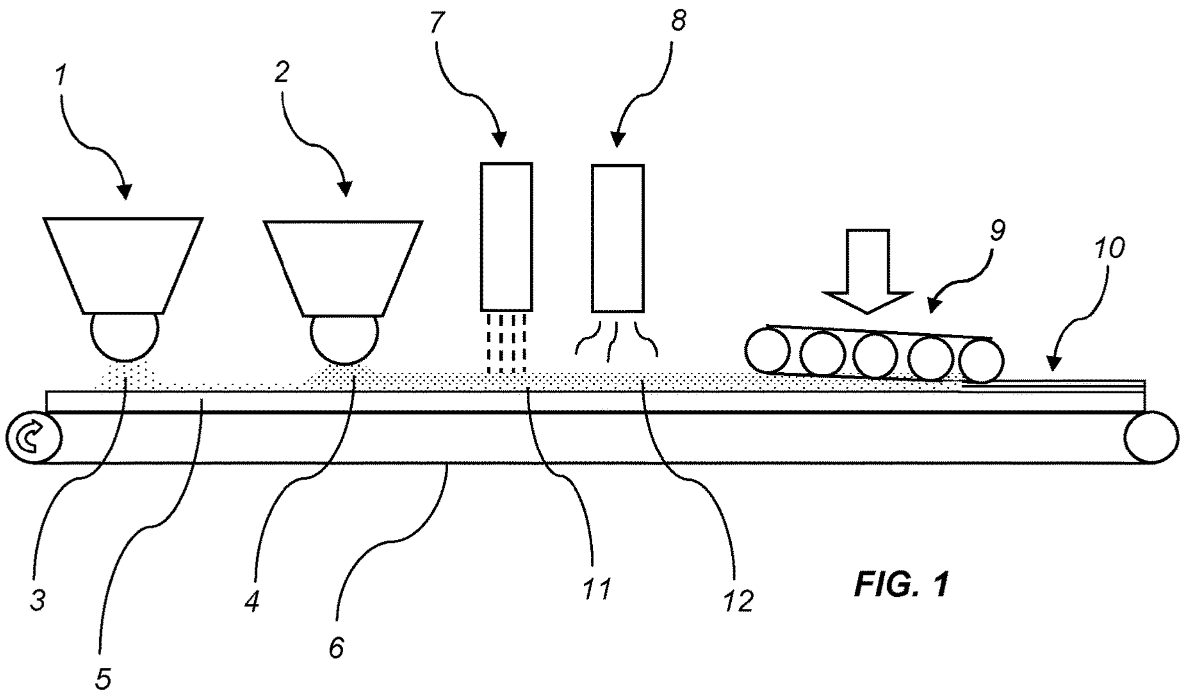
FIG. 1 schematically illustrates a method of manufacturing a building panel according to a first embodiment.

FIG. 1 schematically illustrates a production line for a process for manufacturing a building panel 10. The production line comprises a first applying unit 1 and a second applying unit 2. The production line further comprises a conveying belt 6, a stabilization unit 7 for applying moisture, a heating unit 8 for heating and/or drying powder mixes, and a pressing unit 9.

A first mix 3 is applied by the first applying unit 1. The first mix 3 comprises lignocellulosic or cellulosic particles and a first binder. The first mix 3 may further comprise additives. The first mix 3 is applied as a powder. Preferably, the lignocellulosic or cellulosic particles are mixed with the first binder in powder form. The first mix 3 is preferably a substantially homogenous mix.

In one embodiment, as an alternative or complement to the mix, the first binder and the lignocellulosic or cellulosic particles are applied separately. The first binder may be applied as one layer and the lignocellulosic or cellulosic particles may be applies as another layer. Subsequent steps, described below in relation to a mix, are applicable also for a first layer formed by such a first binder layer and a lignocellulosic or cellulosic particles layer.

The first binder may be urea formaldehyde resin, a mixture comprising urea formaldehyde resin, or a co-polymer comprising urea formaldehyde resin such as melamine-urethane formaldehyde (MUF).

In one embodiment, the first binder may be phenol formaldehyde resin, a mixture comprising phenol formaldehyde resin, or a co-polymer comprising phenol formaldehyde resin.

In one embodiment, the first binder may be a thermoplastic binder. The thermoplastic binder may be polyvinyl acetate (PVAC), a mixture comprising polyvinyl acetate, or a co-polymer comprising polyvinyl acetate. The thermoplastic binder may be polyvinyl chloride (PVC), polypropylene (PP), polyethylene (PE), polyurethane (PU), polystyrene (PS), styrene acrylonitrile (SAN), acrylate or acrylic, a mixture comprising polyvinyl chloride (PVC), polypropylene (PP), polyethylene (PE), polyurethane (PU), polystyrene (PS), styrene acrylonitrile (SAN), acrylate or acrylic, or a co-polymer comprising polyvinyl chloride (PVC), polypropylene (PP), polyethylene (PE), polyurethane (PU), polystyrene (PS), styrene acrylonitrile (SAN), acrylate, methacrylate or acrylic.

In one embodiment, the first binder may be a mixture comprising a thermoplastic binder and a thermosetting resin such as an amino resin. The thermoplastic binder may be polyvinyl acetate, polyvinyl chloride, polypropylene, polyethylene, or polyurethane. The thermosetting resin may be urea formaldehyde resin or melamine formaldehyde resin. A co-polymer may be formed of a thermoplastic binder such as polyvinyl acetate and amino resin such as urea formaldehyde, melamine formaldehyde and/or phenol formaldehyde, especially at low pH.

The lignocellulosic particles comprise lignin. The lignocellulosic particles may be refined particles such as refined wood fibres. The cellulosic particles comprise no lignin or substantially no lignin (e.g., less than 5% lignin by weight). The cellulosic particles may be at least partly bleached particles such as at least partly bleached wood fibres.

The first mix 3 is applied by the first applying unit 1 on a first surface of a carrier. The first applying unit 1 is preferably a scattering unit adapted to scatter the first mix 3 on the carrier. The carrier may be the conveyor belt 6. In the embodiment shown in FIG. 1, the carrier is a core 5. The core 5 is preferably a wood based board such as a HDF, MDF, particleboard, OSB, or WPC (Wood Plastic Composite). The core 5 is arranged on the conveyor belt 6 such that the conveyor belt 6 conveys the core 5. The first mix 3 is adapted from a first layer 11 arranged on a first surface of the core 5. The first mix 3 may be applied in an amount of 100-700 g/m2. The first mix 3 may comprise 45-60% by weight binder.

The first mix 3 may further comprise additives or fillers having sound-absorbing properties such as cork particles and/or barium sulphate (BaSO4).

In one embodiment, the first mix 3 may be stabilized before the second mix 4 is applied (not shown). The first mix 3 may be stabilized by moisture. The moisture may be finely dispersed or may include droplets of a liquid. The first mix 3 may also attract humidity from the air, thereby applying moisture to the first mix 3. The liquid forming the moisture may be water, an alcohol, ink, a binder, preferably a thermosetting binder, more preferably melamine formaldehyde, or a mixture thereof. The liquid may further include substances such as additives, agents, pigments and/or primers, for example controlling a subsequent printing process. The first mix 3 may be dried in a heating device, for example by means of infrared light. The first mix 3 may be pre-pressed before the second mix 4 is applied.

In one embodiment, a print may be printing in the first mix 3 prior to applying a second mix 4, preferably by digital printing.

A second mix 4 is applied by the second applying unit 2 on the first mix 3. The second mix 4 comprises lignocellulosic or cellulosic particles and a second binder. The second binder is a thermosetting binder, preferably an amino resin such as urea formaldehyde, melamine formaldehyde or phenol formaldehyde, or a combination thereof, or copolymer thereof. The second binder may be melamine formaldehyde resin (MF). The second mix 4 may further comprise additives. Preferably, the second mix 4 further comprises wear resistant particles such as aluminum oxide (corundum). The second mix 4 is applied as a powder. Preferably, the lignocellulosic or cellulosic particles are mixed with melamine formaldehyde resin in powder form. The second mix 4 is preferably a substantially homogenous mix. The second mix 4 may further comprise pigments.

In one embodiment, as an alternative or complement to the mix, the second binder and the lignocellulosic or cellulosic particles are applied separately. The second binder may be applied as one layer and the lignocellulosic or cellulosic particles may be applies as another layer. Subsequent steps described below in relation to a mix are applicable also for a second layer formed by such a second binder layer and a lignocellulosic or cellulosic particles layer.

Preferably, the second binder may be in form of melamine formaldehyde resin, a mixture comprising melamine formaldehyde resin, or a co-polymer comprising melamine formaldehyde resin.

The lignocellulosic particles comprise lignin. The lignocellulosic particles may be refined particles such as refined wood fibres. The cellulosic particles comprise no lignin or substantially no lignin (e.g., less than 5% lignin by weight). The cellulosic particles may be at least partly bleached particles such as at least partly bleached wood fibres.

The second applying unit 2 is preferably a second scattering unit adapted to scatter the second mix 4 on the first mix 3. The second mix 4 is adapted to form a second layer 12 arranged on the first layer 11. The second mix 4 may be applied in an amount of 100-700 g/m2. The second mix 4 may comprise 45-60% by weight binder.

The relation between the amount of the first mix 3 and of the second mix 4 applied may for example be 2:3, 1:1, or 1:4 or amounts there between.

Both the first and the second mixes 3, 4 may comprise additives such as wetting agents, release agents, catalysts, anti-static agents, anti-slip agents and pigments etc. By adding a higher amount of catalysts to the first mix 3 compared to the second mix 4, the first layer may be cured faster, thereby preventing binders from transferring from the second mix 4 to the first mix 3.

The first mix 3 and the second mix 4 are thereafter stabilized in the stabilization unit 7. Moisture is applied to the first and the second mixes 3, 4. The moisture may be finely dispersed or may include droplets of a liquid. The first and second mixes 3, 4 may also attract humidity from the air, thereby applying moisture to the first and second mixes 3, 4. The liquid forming the moisture may be water, an alcohol, ink, a binder, preferably a thermosetting binder, more preferably melamine formaldehyde, or a mixture thereof. The liquid may further include substances such as additives, agents, pigments and/or primers, for example adapted to control a subsequent printing process.

The first and second mixes 3, 4 are thereafter dried in a heating device 8, preferably by means of infrared light (IR).

A print may be printed in the second mix 4 prior to pressing, preferably by digital printing.

In one embodiment, the first and second mixes may be pre-pressed.

The core 5 having the first and the second mixes 3, 4 applied thereon is thereafter conveyed to a pressing unit 9. The pressing unit 9 may be a continuous or static press. Heat and pressure are applied to the first and second mix 3, 4 such that the binders are cured and a first and a second layer 11, 12 are formed on the core 5. An embossed press plate may be used to form an embossed structure of the second layer 12.

Figure 2:
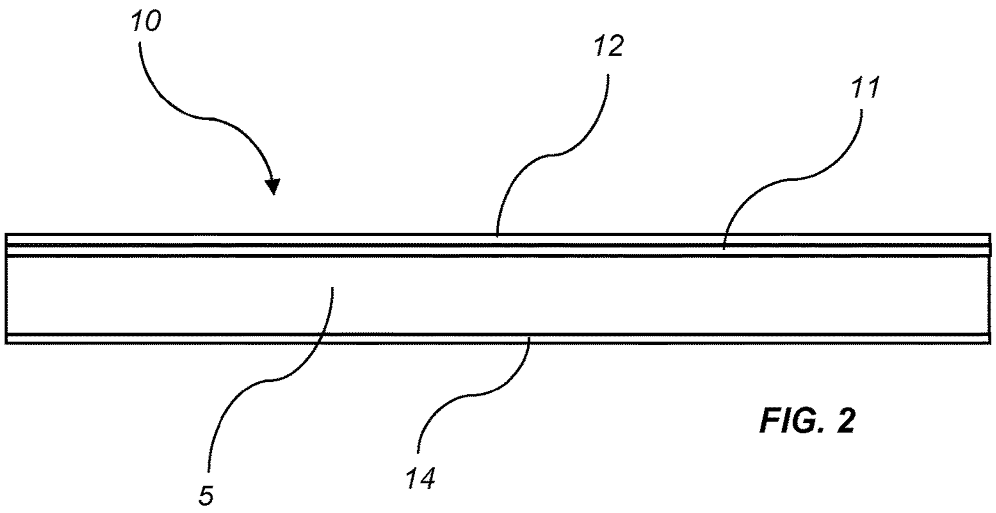
FIG. 2 illustrates a building panel.

FIG. 2 discloses a building panel 10 formed by the method described above. The building panel 10 comprises a core 5, a first layer 11 and a second layer 12. The core 5 may be a wood-based board such as HDF, MDF, particleboard, OSB, or WPC (Wood Plastic Composite). The first layer 11 forms a sub-layer arranged on a first surface of the core 5. The first layer 11 comprises as described above a first mix 3 comprising lignocellulosic or cellulosic material and the first binder of the above described type. The second layer 12 forms a top layer arranged on the first layer 11. The second layer 12 comprises as described above a second mix 4 comprising lignocellulosic or cellulosic material and the second binder of the above described type. The second layer 12 may be a decorative surface layer. The second mix 4 may further comprise pigments, a print etc. A print, preferably printed by digital printing, may be printed in the second mix 4, preferably before curing. Preferably, the second layer 12 comprises wear resistant particles such as aluminum oxide.

The first layer 11 and the second layer 12 may be differently coloured, for example by adding different pigments to the first mix 3 and the second mix 4. A decorative groove may be formed in the second layer 12 such that the first layer 11 is visible.

A balancing layer 14 may be applied to a second surface of the core 5, opposite the first surface, as shown in FIG. 2. The balancing layer 14 is adapted to balance forces formed by the first and second layers 11, 12 during pressing, cooling and climate changes. The balancing layer 14 may also be formed of a mix comprising lignocellulosic or cellulosic material and a binder, preferably a thermosetting binder. The thermosetting binder may an amino resin such as urea formaldehyde or melamine formaldehyde. The mix is cured during the above described pressing to form a balancing layer. The balancing layer 14 may be produced as described in WO 2012/141647.

In the embodiments described above with reference to FIG. 1 and FIG. 2, the first mix 3 is applied on a core 5 arranged on the carrier. In one embodiment, the first mix 3 is applied directly on the carrier. The carrier may be a conveyor belt 6, a temporary carrier such as a plate etc. As described above, the first mix 3 comprises lignocellulosic or cellulosic particles and the first binder of the above descried type, for example comprising urea formaldehyde resin, phenol formaldehyde resin, or a thermoplastic binder.

The second mix 4 is applied on the first mix 3. The second mix comprises as described above lignocellulosic or cellulosic particles and the second binder of the above described type. The second binder may, for example, be a thermosetting resin, preferably an amino resin such as melamine formaldehyde, urea formaldehyde, phenol formaldehyde or a combination thereof. The second mix 4 may further comprise wear resistant particles, pigments, additives etc. The first and second mixes 3, 4 may be stabilized as described above with reference to FIG. 1. Heat and pressure is applied to the first and second mix 3, 4 in a pressing unit as described above. The first mix 3 is formed to a first layer 11. The second mix 4 is cured to a second layer 12. By pressing, the first and second layers 11, 12 are simultaneously adhered to each other. Thereby, a panel comprising a first and a second layer 11, 12 are formed. The panel may be adhered to a core in a later process, in a similar way as a compact laminate.

Figure 3:
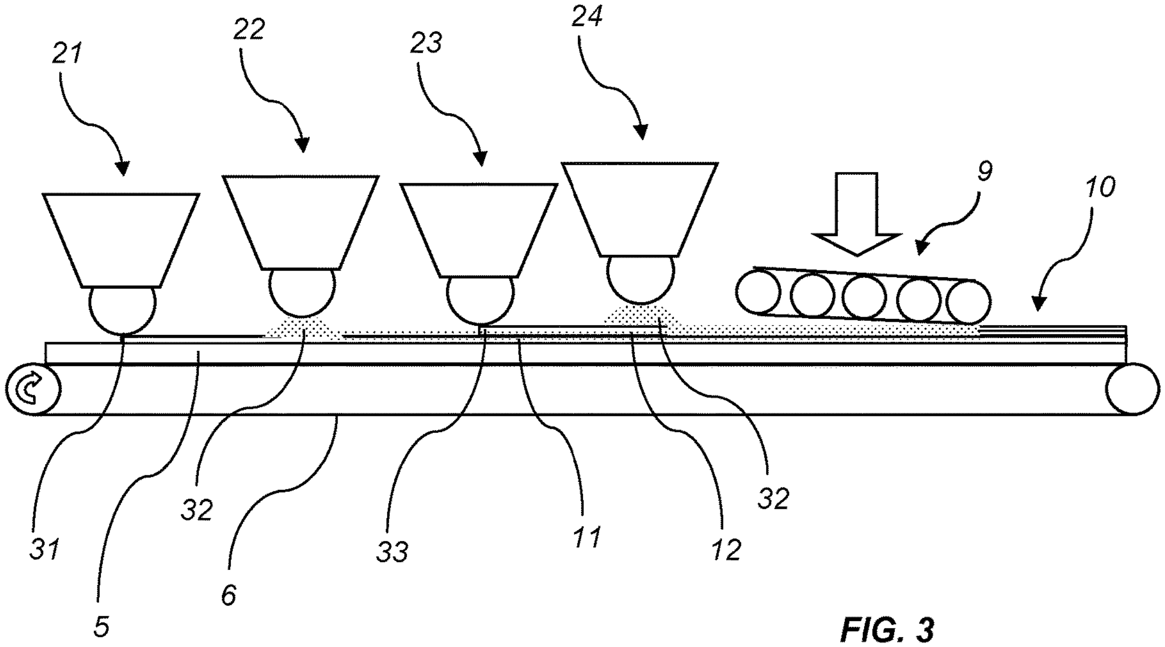
FIG. 3 schematically illustrates a method of manufacturing a building panel according to a second embodiment.

FIG. 3 schematically illustrates a production line for a process for manufacturing a building panel 10 according to a second embodiment. The production line comprises a first applying unit 21, a second applying unit 22, a third applying unit 23, and fourth applying unit 24. The production line further comprises a conveying belt 6, optional heating units (not shown) for heating and/or drying the layers, and a pressing unit 9.

The first applying unit 21 applies a first binder 31 in liquid form on a first surface of the carrier. In the embodiment shown in FIG. 3, the carrier is a core 5. The core 5 is preferably a wood based board such as a HDF, MDF, particleboard, OSB, or WPC (Wood Plastic Composite). The core 5 is arranged on the conveyor belt 6 such that the conveyor belt 6 conveys the core 5.

The first binder 31 is thus applied as a liquid dispersion. The dispersion may be a solution or a suspension. The first binder may dissolved in a solvent, preferably water. The binder content of the dispersion may be 30-90% by weight.

The first binder 31 may be urea formaldehyde resin, a mixture comprising urea formaldehyde resin, or a co-polymer comprising urea formaldehyde resin such as melamine-urethane formaldehyde (MUF).

In one embodiment, the first binder 31 may be phenol formaldehyde resin, a mixture comprising phenol formaldehyde resin, or a co-polymer comprising phenol formaldehyde resin.

In one embodiment, the first binder 31 may be a thermoplastic binder. The thermoplastic binder may be polyvinyl acetate (PVAC), a mixture comprising polyvinyl acetate, or a co-polymer comprising polyvinyl acetate. The thermoplastic binder may be polyvinyl chloride (PVC), polyurethane (PU), polystyrene (PS), styrene acrylonitrile (SAN), acrylate or methacrylate, a mixture comprising polyvinyl chloride (PVC), polyurethane (PU), polystyrene (PS), styrene acrylonitrile (SAN), acrylate or methacrylate, or a co-polymer comprising polyvinyl chloride (PVC), polyurethane (PU), polystyrene (PS), styrene acrylonitrile (SAN), acrylate, methacrylate or acrylic.

In one embodiment, the first binder 31 may be a mixture comprising a thermoplastic binder and a thermosetting resin such as an amino resin applied in liquid form. The thermoplastic binder may be polyvinyl acetate, or polyurethane. The thermosetting resin may be urea formaldehyde resin or melamine formaldehyde resin. A co-polymer may be formed of a thermoplastic binder such as polyvinyl acetate and amino resin such as urea formaldehyde, melamine formaldehyde and/or phenol formaldehyde, especially at low pH.

The dispersion comprising the first binder 31 may further comprise additives, pigments and fillers. The dispersion may further comprise additives or fillers having sound-absorbing properties such as cork particles and/or barium sulphate ($BaSO4$).

The second applying unit 22 applies, preferably scatters, lignocellulosic or cellulosic particles 32 into the liquid first binder 31 applied on the core. Preferably, the lignocellulosic or cellulosic particles 32 are applied into a wet binder layer arranged on the core.

The lignocellulosic or cellulosic particles 32 are free particles when applied into the liquid first binder. For example, the lignocellulosic or cellulosic particles 32 may be applied as a powder.

The lignocellulosic particles comprise lignin. The lignocellulosic particles may be refined particles such as refined wood fibres. The cellulosic particles comprise no lignin or substantially no lignin (e.g., less than 5% lignin by weight). The cellulosic particles may be at least partly bleached particles such as at least partly bleached wood fibres.

The first binder 31 applied in liquid form and the lignocellulosic or cellulosic particles 32 forms a first layer 11. The first layer 11 may be dried, preferably by applying heat or IR, prior to further processing steps.

In one embodiment, a print may be printing in the first layer 11 prior to applying a second layer 12, preferably by digital printing.

A third applying unit 23 applies a second binder 33 in liquid form on the first layer 11.

The second binder 33 is thus applied as a liquid dispersion. The dispersion may be a solution or a suspension. The second binder may dissolved in a solvent, preferably water. The binder content of the dispersion may be 30-90% by weight.

The second binder 33 may be a thermosetting binder, preferably an amino resin such as urea formaldehyde, melamine formaldehyde or phenol formaldehyde, or a combination thereof, or co-polymer thereof. The second binder may be melamine formaldehyde resin (MF), a mixture comprising melamine formaldehyde resin, or a co-polymer comprising melamine formaldehyde resin.

The dispersion comprising the second binder 33 may further comprise additives. Preferably, the dispersion further comprises wear resistant particles such as aluminum oxide (corundum).

The fourth applying unit 24 applies, preferably scatters, lignocellulosic or cellulosic particles 32 into the liquid second binder 33 applied on the core. Preferably, the lignocellulosic or cellulosic particles 32 are applied into a wet binder layer arranged on the core.

The lignocellulosic or cellulosic particles 32 are free particles when applied into the liquid second binder 33. For example, the lignocellulosic or cellulosic particles 32 may be applied as a powder.

The lignocellulosic particles comprise lignin. The lignocellulosic particles may be refined particles such as refined wood fibres. The cellulosic particles comprise no lignin or substantially no lignin (e.g., less than 5% lignin by weight). The cellulosic particles may be at least partly bleached particles such as at least partly bleached wood fibres.

The second binder 33 applied in liquid form and the lignocellulosic or cellulosic particles 32 forms a second layer 12. The first layer 11, and the second layer 12, may be dried prior, preferably by applying heat or IR, to further processing steps.

In one embodiment, a print may be printing in the second layer 12 prior to pressing, preferably by digital printing.

The relation between the amount of the first layer 11 and of the second layer 12 may for example be 2:3, 1:1, or 1:4 or amounts there between.

Both the dispersion comprising the first binder 31 and the dispersion comprising the second binder 33 may comprise additives such as wetting agents, release agents, catalysts, anti-static agents, anti-slip agents and pigments etc. By adding a higher amount of catalysts to the dispersion comprising the first binder compared to the dispersion comprising the second binder, the first layer may be cured faster, thereby preventing binders from transferring from the second layer 12 to the first layer 11.

The core 5 having the first and the second layers 11, 12 applied thereon is thereafter conveyed to a pressing unit 9. The pressing unit 9 may be a continuous or static press. Heat and pressure are applied to the first and second layers 11, 12 such that the thermosetting binders are cured and a surface layer comprising the first and second layer 11, 12 is formed on the core 5. An embossed press plate may be used to form an embossed structure of the second layer 12.

Embodiments of the resulting building panel produced according to the method described with reference to FIG. 3 may be similar to the building panel shown in FIG. 2. The concentration of the lignocellulosic or cellulosic particles in the first and second layer may differ through the layers compared to when layers are applied as a mix comprising the lignocellulosic or cellulosic particles and the binder.

Figure 4:
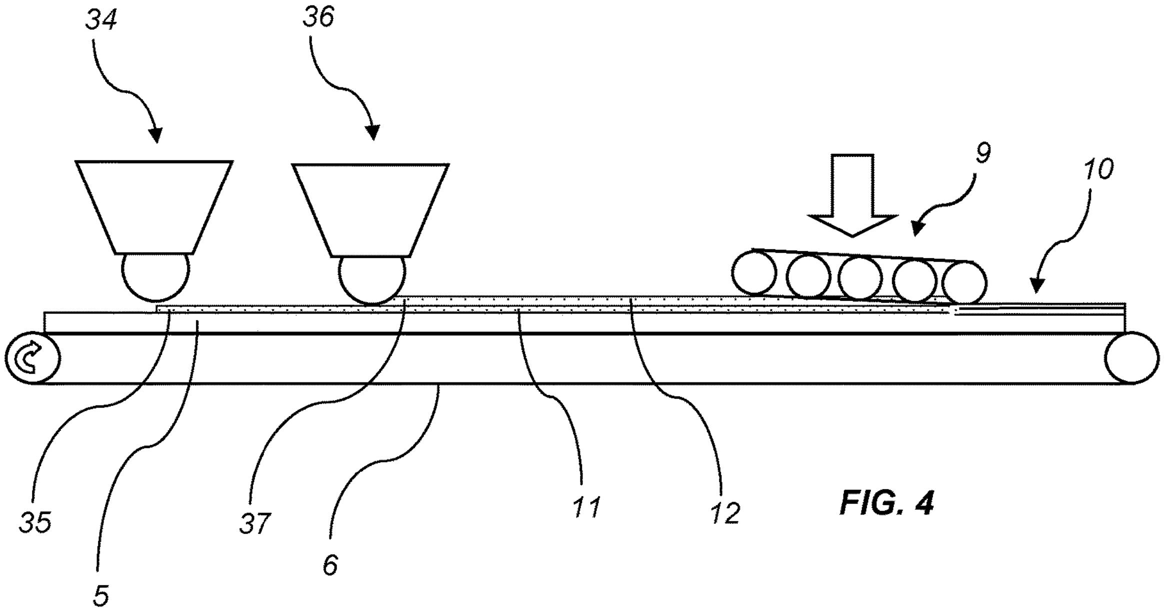
FIG. 4 schematically illustrates a method of manufacturing a building panel according to a third embodiment.

FIG. 4 schematically illustrates a production line for a process for manufacturing a building panel 10 according to a third embodiment. The production line comprises a first applying unit 34, and a second applying unit 36. The production line further comprises a conveying belt 6, optional heating units (not shown) for heating and/or drying the layers, and a pressing unit 9.

The first applying unit 34 applies a first liquid dispersion 35 comprising a first binder and lignocellulosic or cellulosic particles on a first surface of the carrier. In the embodiment shown in FIG. 4, the carrier is a core 5. The core 5 is preferably a wood based board such as a HDF, MDF, particleboard, OSB, or WPC (Wood Plastic Composite). The core 5 is arranged on the conveyor belt 6 such that the conveyor belt 6 conveys the core 5.

The lignocellulosic particles comprise lignin. The lignocellulosic particles may be refined particles such as refined wood fibres. The cellulosic particles comprise no lignin or substantially no lignin (e.g., less than 5% lignin by weight). The cellulosic particles may be at least partly bleached particles such as at least partly bleached wood fibres.

The first binder is thus applied as a first liquid dispersion 35. The first liquid dispersion 35 may be a solution or a suspension. The first binder may dissolved in a solvent, preferably water. The binder content of the dispersion may be 30-90% by weight. The lignocellulosic or cellulosic particles content of the first liquid dispersion may be 10-40% by weight.

The first binder may be urea formaldehyde resin, a mixture comprising urea formaldehyde resin, or a co-polymer comprising urea formaldehyde resin such as melamine-urethane formaldehyde (MUF).

In one embodiment, the first binder may be phenol formaldehyde resin, a mixture comprising phenol formaldehyde resin, or a co-polymer comprising phenol formaldehyde resin.

In one embodiment, the first binder may be a thermoplastic binder. The thermoplastic binder may be polyvinyl acetate (PVAC), a mixture comprising polyvinyl acetate, or a co-polymer comprising polyvinyl acetate. The thermoplastic binder may be polyvinyl chloride (PVC), polyurethane (PU), polystyrene (PS), styrene acrylonitrile (SAN), acrylate or methacrylate, a mixture comprising polyvinyl chloride (PVC), polyurethane (PU), polystyrene (PS), styrene acrylonitrile (SAN), acrylate or methacrylate, or a co-polymer comprising polyvinyl chloride (PVC), polyurethane (PU), polystyrene (PS), styrene acrylonitrile (SAN), acrylate, methacrylate or acrylic.

In one embodiment, the first binder may be a mixture comprising a thermoplastic binder and a thermosetting resin such as an amino resin applied in liquid form. The thermoplastic binder may be polyvinyl acetate, or polyurethane. The thermosetting resin may be urea formaldehyde resin or melamine formaldehyde resin. A co-polymer may be formed of a thermoplastic binder such as polyvinyl acetate and amino resin such as urea formaldehyde, melamine formaldehyde and/or phenol formaldehyde, especially at low pH.

The first liquid dispersion 35 comprising the first binder may further comprises additives, pigments and fillers. The dispersion may further comprise additives or fillers having sound-absorbing properties such as cork particles and/or barium sulphate ($BaSO_4$).

The first liquid dispersion 35 comprising the first binder and the lignocellulosic or cellulosic particles forms a first layer 11. The first layer 11 may be dried, preferably by applying heat or IR, prior to further processing steps.

In one embodiment, a print may be printing in the first layer 11 prior to applying a second layer 12, preferably by digital printing.

A second applying unit 36 applies a second liquid dispersion 37 comprising a second binder and lignocellulosic or cellulosic particles on the first layer 11.

The second binder is thus applied as a second liquid dispersion 37. The second liquid dispersion 37 may be a solution or a suspension. The second binder may dissolved in a solvent, preferably water. The binder content of the dispersion may be 30-90% by weight. The lignocellulosic or cellulosic particles content of the second liquid dispersion may be 10-40% by weight.

The second binder is a thermosetting binder, preferably an amino resin such as urea formaldehyde, melamine formaldehyde or phenol formaldehyde, or a combination thereof, or co-polymer thereof. The second binder may be melamine formaldehyde resin (MF), a mixture comprising melamine formaldehyde resin, or a co-polymer comprising melamine formaldehyde resin.

The second liquid dispersion 37 comprising the second binder may further comprise additives. Preferably, the liquid dispersion further comprises wear resistant particles such as aluminum oxide (corundum).

The lignocellulosic or cellulosic particles are free particles when applied into the liquid first and second binder. The lignocellulosic or cellulosic particles are applied as a powder.

The lignocellulosic particles comprise lignin. The lignocellulosic particles may be refined particles such as refined wood fibres. The cellulosic particles comprise no lignin or substantially no lignin (e.g., less than 5% lignin by weight). The cellulosic particles may be at least partly bleached particles such as at least partly bleached wood fibres.

The second dispersion 37 comprising the second binder and the lignocellulosic or cellulosic particles forms a second layer 12. The first layer 11, and the second layer 12, may be dried prior, preferably by applying heat or IR, to further processing steps.

In one embodiment, a print may be printing in the second layer 12 prior to pressing, preferably by digital printing.

The relation between the amount of the first layer 11 and of the second layer 12 may for example be 2:3, 1:1, or 1:4 or amounts there between.

Both the first liquid dispersion 35 comprising the first binder and the second liquid dispersion 37 comprising the second binder may comprise additives such as wetting agents, release agents, catalysts, anti-static agents, anti-slip agents and pigments etc. By adding a higher amount of catalysts to the dispersion 35 comprising the first binder compared to the dispersion 37 comprising the second binder, the first layer may be cured faster, thereby preventing binders from transferring from the second layer 12 to the first layer 11.

The core 5 having the first and the second layers 11,12 applied thereon is thereafter conveyed to a pressing unit 9. The pressing unit 9 may be a continuous or static press. Heat and pressure are applied to the first and second layers 11,12 such that the thermosetting binders are cured and a surface layer comprising the first and second layer 11,12 is formed on the core 5. An embossed press plate may be used to form an embossed structure of the second layer 12.

Embodiments of the resulting building panel produced according to the method described with reference to FIG. 4 may be similar to the building panel shown in FIG. 2. The concentration of the lignocellulosic or cellulosic particles in the first and second layer may differ through the layers compared to when layers are applied as a mix comprising the lignocellulosic or cellulosic particles and the binder.

It is contemplated that there are numerous modifications of the embodiments described herein, which are still within the scope of the disclosure as defined by the appended claims. It is for example contemplated that the first layer is adapted to cover the carrier such that the colour of the carrier does not shine through. The first layer may form a sub-layer for a print layer.

It is also contemplated that one layer may be applied according to one of the embodiments including a liquid binder, and that the other layer is applied according to any one of the embodiments including applying the binder in powder form. For example, the first binder may be applied in liquid form, and the second binder may be applied in powder form, or vice versa.

It is also contemplated that more than one first layer and/or more than one second layer is applied on the carrier to form a building panel comprising more than one first layer and/or more than one second layer. The building panel may also comprise additional layers.

It is also contemplated that the first layer and/or the second layer may be applied as a pre-preg. The first mix and/or the second mix of the above described type may be stabilized into a pre-preg, for example by applying moisture, prior to be applied on the carrier.

EXAMPLES

Example 1: Comparative Example 1

650 g/m2 of formulation A was scattered on a HDF board provided with a balancing layer. The product was pressed in short cycle press resulting in a balanced board to be used in further processing such as sawing and profiling. Sawing and profiling resulted in floor panels. The dimensional changes of the floor panels upon different climate conditions were inspected and used for comparison with products made according to the disclosure.

Example 2: Thermosetting Sub Layer 400 g/m2 of formulation B was scattered on a HDF board provided with a balancing layer. On top of formulation B 400 g/m2 of formulation A was scattered. The product was pressed in a short cycle press resulting in a balanced board to be used in further processing such as sawing a profiling. Sawing and profiling resulted in floor panels. The dimensional changes of the floor panels upon different climate conditions were inspected and found to be less than for the products made according to the Comparative Example 1.

Example 3: Comparative Example 2 Sub Layer 500 g/m2 of formulation D was scattered on a HDF board provided with a balancing layer. On top of formulation D 300 g/m2 of formulation C was scattered. The product was pressed in short cycle press resulting in a balanced board to be used in further processing such as sawing and profiling. Sawing and profiling resulted in floor panels. The dimensional changes of the floor panels upon different climate conditions were inspected and used for comparison with products made according to the disclosure.

Example 4: Thermoplastic Sub Layer 500 g/m2 of formulation E was scattered on a HDF board provided with a balancing layer. On top of formulation D 300 g/m2 of formulation C was scattered. The product was pressed in short cycle press resulting in a balanced board to be used in further processing such as sawing and profiling. Sawing and profiling resulted in floor panels. The dimensional changes of the floor panels upon different climate conditions were inspected and found to be less than for the products made according to the Comparative Example 2.

Formulations

| | A (wt-%) | B (wt-%) | C (wt-%) | D (wt-%) | E (wt-%) |
|---|---|---|---|---|---|
| Lignocellulosic material | 14.75 | 14.75 | | | |
| Cellulosic material | 15.66 | 15.66 | 12 | 50 | 50 |
| Melamine formaldehyde resin | 52.5 | 13.125 | 75 | 30 | 15 |
| Urea formaldehyde resin | | 39.375 | | | |
| Thermoplastic resin | | | | | 15 |
| Aluminum oxide | 8.8 | 8.8 | 10 | 10 | 10 |
| Titanium dioxide | 3.4 | 3.4 | 3 | 10 | 10 |
| Pigment preparation | 4.89 | 4.89 | | | |
| Total | 100 | 100 | 100 | 100 | 100 |

LIST OF EMBODIMENTS

1. A method of manufacturing a building panel (10), comprising applying a first binder and free lignocellulosic or cellulosic particles on a first surface of a carrier for forming a first layer (11), applying a second binder and free lignocellulosic or cellulosic particles on the first layer (11) for forming a second layer (12), wherein the first binder is different from the second binder, and applying heat and pressure to the first and second layers (11, 12) to form a building panel.

2. A method according to item 1, wherein the first binder is urea formaldehyde resin, a mixture comprising urea formaldehyde resin, or a co-polymer comprising urea formaldehyde resin.

3. A method according to item 1, wherein the first binder is phenol formaldehyde resin, a mixture comprising phenol formaldehyde resin, or a co-polymer comprising phenol formaldehyde resin.

4. A method according to any one of the preceding items, wherein the second binder is melamine formaldehyde resin, a mixture comprising melamine formaldehyde resin, or a co-polymer comprising melamine formaldehyde resin.

5. A method according to item 1, wherein the first binder comprises a thermoplastic binder and the second binder comprises a thermosetting binder.

6. A method according to any one of the preceding items, wherein applying the first binder and said free lignocellulosic or cellulosic particles comprises applying a first mix (3) comprising the first binder and said free lignocellulosic or cellulosic particles.

7. A method according to item 6, wherein the first mix (3) is a first powder mix.

8. A method according to any one of items 1-5, wherein said first binder is applied in liquid form.

9. A method according to item 8, wherein said free lignocellulosic or cellulosic particles are applied onto the liquid first binder.

10. A method according to any one of the preceding items, wherein applying the second binder and said free lignocellulosic or cellulosic particles comprises applying a second mix (4) comprising the second binder and said free lignocellulosic or cellulosic particles.

11. A method according to item 10, wherein the second mix (4) is a second powder mix.

12. A method according to any one of items 1-9, wherein said second binder is applied in liquid form.

13. A method according to item 12, wherein said free lignocellulosic or cellulosic particles are applied onto the liquid second binder.

14. A method according to any one of the preceding items, wherein the second layer (12) further comprises wear resistant particles.

15. A method according to any one of the preceding items, wherein the carrier is a wood based board (5), preferably a HDF or MDF.

16. A method according to any one of the preceding items, further comprising applying a balancing layer (14) on a second surface of the carrier being opposite to said first surface.

17. A method according to any one of the preceding items, wherein the binder concentration of the first layer (11) substantially correspond to the binder concentration of the second layer (12).

18. A method according to any one of the preceding items, wherein the building panel (10) is a floor panel.

19. A building panel (10), comprising a carrier (5), preferably a wood based board, a first layer (11) arranged on a first surface of the carrier (5), a second layer (12) arranged on the first layer (11), wherein the first layer (11) comprises a mix of lignocellulosic or cellulosic particles and a first binder, and the second layer (12) comprises a mix of lignocellulosic or cellulosic particles and a second binder, wherein the first binder is different from the second binder.

20. A building panel according to item 19, wherein the first binder is urea formaldehyde resin, a mixture comprising urea formaldehyde resin, or a co-polymer comprising urea formaldehyde resin.

21. A building panel according to item 19, wherein the first binder is phenol formaldehyde resin, a mixture comprising phenol formaldehyde resin, or a co-polymer comprising phenol formaldehyde resin.

22. A building panel according to any one of items 19-22, wherein the second binder is melamine formaldehyde resin, a mixture comprising melamine formaldehyde resin, or a co-polymer comprising melamine formaldehyde resin.

23. A building panel according to item 19, wherein the first binder comprises a thermoplastic binder and the second binder comprises a thermosetting binder.

24. A building panel according to any one of items 19-23, further comprising a balancing layer (14) arranged on a second surface of the carrier (5) being opposite to said first surface, wherein the balancing layer (14) comprises a mix comprising lignocellulosic or cellulosic particles and a binder.

The invention claimed is:

1. A method of manufacturing a building panel, comprising applying a first binder and free lignocellulosic or cellulosic particles on a first surface of a solid core for forming a first layer, applying a second binder and free lignocellulosic or cellulosic particles on the first layer for forming a second layer, wherein the first binder is different from the second binder, wherein the first binder comprises a thermoplastic binder or a mixture comprising a thermoplastic binder and a thermosetting resin, and the second binder comprises a thermosetting binder, and applying heat and pressure to the first and second layers to form a building panel, wherein applying the first binder and said free lignocellulosic or cellulosic particles comprises applying a first mix comprising the first binder and said free lignocellulosic or cellulosic particles, wherein the first mix is free of cork particles.

2. A method according to claim 1, wherein the first mix is a first powder mix.

3. A method according to claim 1, wherein applying the second binder and said free lignocellulosic or cellulosic particles comprises applying a second mix comprising the second binder and said free lignocellulosic or cellulosic particles.

4. A method according to claim 3, wherein the second mix is a second powder mix.

5. A method according to claim 1, wherein said second binder is applied in liquid form.

6. A method according to claim 5, wherein said free lignocellulosic or cellulosic particles are applied onto the liquid second binder.

7. A method according to claim 1, wherein the second layer further comprises wear resistant particles.

8. A method according to claim 1, wherein the core is a wood based board.

9. A method according to claim 1, further comprising applying a balancing layer on a second surface of the core being opposite to said first surface.

10. A method according to claim 1, wherein the binder concentration of the first layer substantially correspond to the binder concentration of the second layer.

11. A method according to claim 1, wherein the thermoplastic binder is polyvinyl acetate, a mixture comprising polyvinyl acetate, or a co-polymer comprising polyvinyl acetate.

12. A method according to claim 1, wherein the second binder is an amino resin.

13. A method according to claim 1, wherein the thermosetting resin of the mixture of the first binder is an amino resin.

* * * * *